(12) United States Patent
Lantz et al.

(10) Patent No.: US 7,965,615 B2
(45) Date of Patent: Jun. 21, 2011

(54) PROBE STORAGE DEVICE SCANNER CHIP HAVING A MULTI-LAYER MEDIA SUPPORT TABLE

(75) Inventors: Mark A. Lantz, Adliswil (CH); Hugo E. Rothuizen, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 648 days.

(21) Appl. No.: 11/955,516

(22) Filed: Dec. 13, 2007

(65) Prior Publication Data

US 2009/0154330 A1    Jun. 18, 2009

(51) Int. Cl.
   *G11B 9/00*    (2006.01)
(52) U.S. Cl. ...................................... 369/126
(58) Field of Classification Search .................. 369/126
   See application file for complete search history.

(56) References Cited

U.S. PATENT DOCUMENTS

| | | | |
|---|---|---|---|
| 5,834,864 A * | 11/1998 | Hesterman et al. | 310/40 MM |
| 5,986,381 A | 11/1999 | Hoen et al. | |
| 6,583,524 B2 | 6/2003 | Brandt | |
| 6,639,313 B1 | 10/2003 | Martin et al. | |
| 6,953,985 B2 | 10/2005 | Lin et al. | |
| 7,132,721 B2 | 11/2006 | Platt et al. | |
| 7,239,544 B2 * | 7/2007 | Chen et al. | 365/163 |
| 2003/0057803 A1 | 3/2003 | Hartwell | |
| 2004/0245462 A1 | 12/2004 | Binnig et al. | |

OTHER PUBLICATIONS

J. Fernando Alfaro and Gary K. Fedder, Actuation for Probe-Based Mass Data Storage, p. 1-4, Carnegie Mellon University, Pittsburgh.
Y. Lu et al., Design, Fabrication and Control of a Micro X-Y Stage with Large Ultra-thin Film Recoding Media Platform, Proceedings of the 2005 IEEE/ASME International Conference on Advanced Intelligent Mechatronics, Jul. 2005, p. 19-24, Monterey.
Mark A. Lantz et al., A Vibration Resistant Nanopositioner for Mobile Parallel-Probe Storage Applications, Journal for Microelectronical Systems, Feb. 2007, p. 130-139, vol. 16, No. 1, IEEE.
J. Fernando Alfaro and Gary K. Fedder, Actuation for Probe-based Mass Data Storage, in Technical Proceedings of the Fifth International Conference of Modeling and Simulation of Microsystems (MSM '02), Apr. 22-25, 2002, pp. 202-205, San Juan Puerto Rico.

* cited by examiner

*Primary Examiner* — Joseph Haley
*Assistant Examiner* — Nicholas Lee
(74) *Attorney, Agent, or Firm* — Cantor Colburn LLP; Stephen Kaufman

(57) ABSTRACT

A probe storage device includes a base plate having a main body provided with a substantially planar surface, and a scanner chip body. The scanner chip body extends across the base plate. The scanner chip body includes first and second substantially parallel planar surfaces that collectively define an outer peripheral edge portion. The scanner chip body further includes at least a mechanical ground portion fixedly mounted to the base plate, a suspension portion, and a scan table base portion. The scan table base portion is selectively movable relative to the mechanical ground portion. The probe storage device further includes a scan table platform. The scan table platform includes first and second parallel substantially planar surfaces. The scan table platform extends across, is offset relative to, and mechanically linked with the scan table base portion so as to form a composite multi-layered support table for the media.

4 Claims, 3 Drawing Sheets

PROBE STORAGE DEVICE SCANNER CHIP HAVING A MULTI-LAYER MEDIA SUPPORT TABLE

BACKGROUND OF THE INVENTION

1. Field of the Invention

This invention relates to the art of probe storage devices and, more particularly, to a semiconductor probe storage device having a multi-layer media support table.

2. Description of Background

Parallel probe-based data-storage systems are currently being developed for future data-storage applications. A parallel probe-based system employs a large array of atomic-force microscope probes that read, write and erase data on a storage medium carried by an X/Y scanning system. The atomic-force microscope probes enable very high storage densities to be achieved. Moreover, by operating the array of probes in parallel, high data transfer rates are also achievable. The high storage capacity, combined with rapid transfer rates, enables the storage system to be built into a small package that is ideal for mobile storage applications.

Mobile storage systems present a variety of engineering challenges. First, mobile storage systems must be robust against vibration and shock. Second, mobile storage systems must be capable of operating on a restricted power budget. A mobile probe based storage system should be capable of maintaining sub-nanometer tracking performance while being subjected to mechanical shocks that create accelerations that approach 10's of g's. However, making a mechanical device more robust, i.e., capable of withstanding high accelerations, typically requires making components stiffer. By making the components stiffer, power consumption for certain components, e.g., actuators, will increase thereby rendering the device less desirable for mobile applications. In addition, a conventional vibration isolation structure limits the overall size of media capable of being incorporated into existing scanner chips. At present, media support surfaces must have an area that is identical or smaller than an associated suspension system in order to maintain vibration isolation.

SUMMARY OF THE INVENTION

The shortcomings of the prior art are overcome and additional advantages are provided through the provision of a probe storage device. The probe storage device includes a base plate having a main body provided with a substantially planar surface, and a scanner chip body. The scanner chip body extends across the base plate. The scanner chip body includes first and second substantially parallel planar surfaces that collectively define an outer peripheral edge portion. The scanner chip body further includes at least a mechanical ground portion fixedly mounted to the base plate, a suspension portion, and a scan table base portion. The scan table base portion is selectively movable relative to the mechanical ground portion. The probe storage device further includes a scan table platform. The scan table platform includes first and second parallel substantially planar surfaces. The scan table platform extends across, is offset relative to, and mechanically linked with the scan table base portion so as to form a composite multi-layered support table for the media.

Additional features and advantages are realized through the techniques of exemplary embodiments of the present invention. Other embodiments and aspects of the invention are described in detail herein and are considered a part of the claimed invention. For a better understanding of the invention with advantages and features thereof, refer to the detailed description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the exemplary embodiments of the invention, together with advantages and features, by way of example with reference to the drawings.

DETAILED DESCRIPTION OF THE INVENTION

Figure 1:
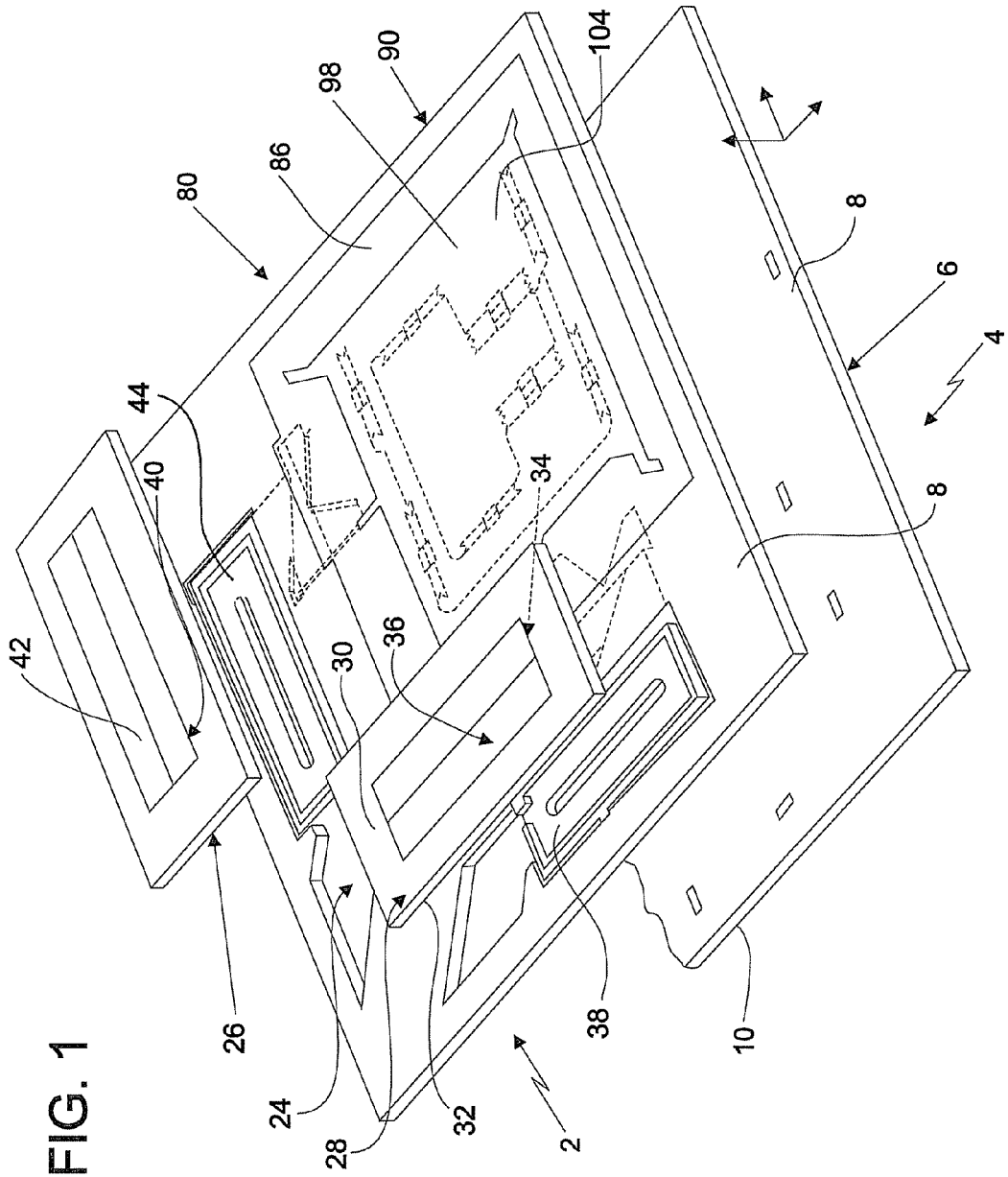
FIG. 1 is an exploded perspective view of a scanner chip for a probe storage device including multi-layer media support table constructed in accordance with an exemplary embodiment of the present invention.
Figure 2:
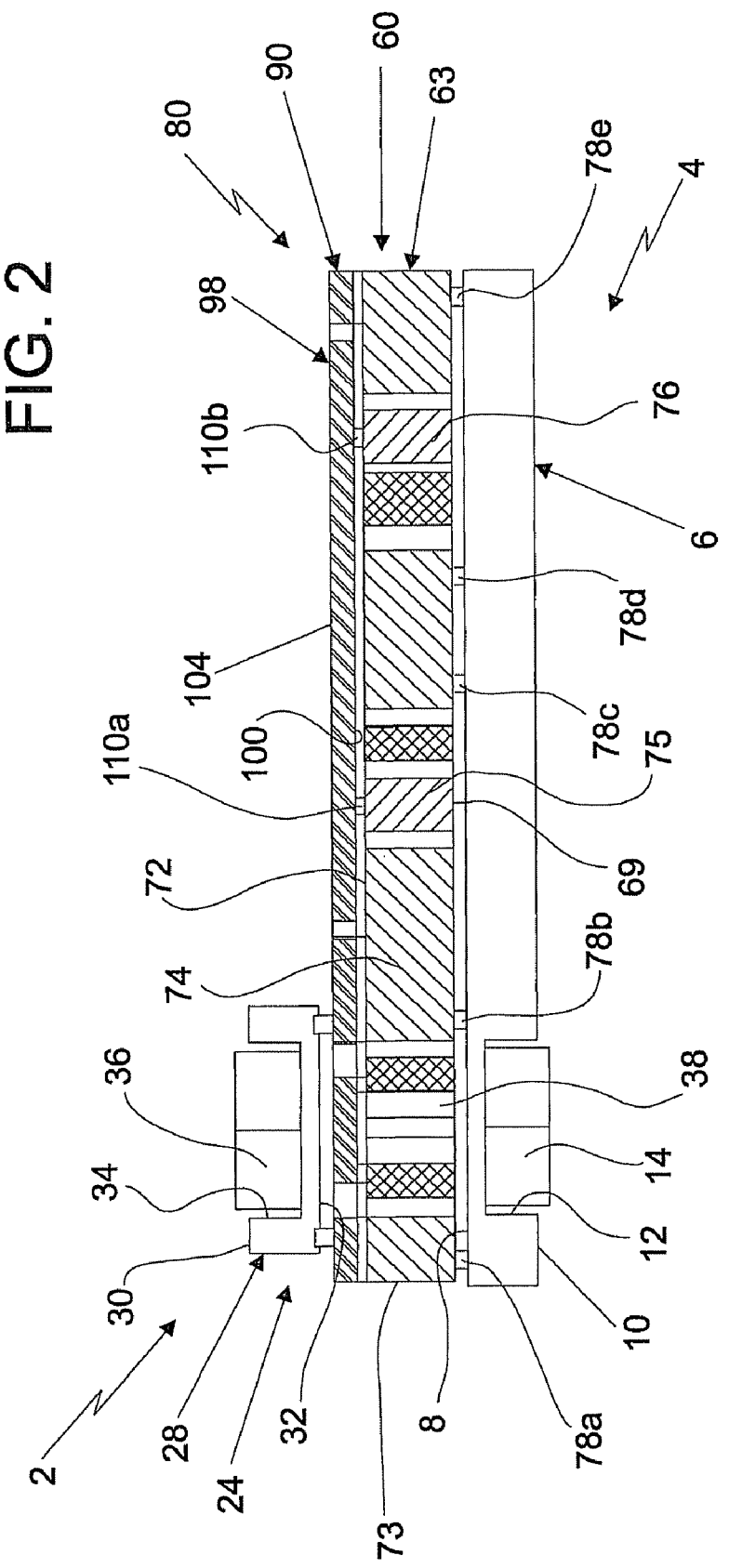
FIG. 2 is a cross-sectional side view of the scanner chip of FIG. 1.

With initial reference to FIGS. 1 and 2, a scanner assembly for a probe storage device constructed in accordance with an exemplary embodiment of the present invention is generally indicated at 2. Scanner assembly 2 includes a base plate 4 having a main body 6 that defines a first planar surface 8 and a second, opposing planar surface 10. Base plate 4 includes a magnet receiving portion 12 formed in main body 6 having arranged therein a magnet 14. Although not shown, base plate 4 includes another magnet receiving portion having an associated other magnet (also not shown). Scanner assembly 2 also includes first and second top plates 24 and 26. As shown, top plate 24 includes a main body 28 that defines a first planar surface 30 and a second, opposing planar surface 32. Top plate 24 includes a magnet receiving section 34 having arranged therein a magnet 36. Top plate 24 is positioned relative to base plate 4 such that magnet 36 is spaced from, yet in vertical alignment with, magnet 14. A first coil 38 is arranged between magnet 36 and magnet 14. First coil 38 forms part of an actuating mechanism (not separately labeled) for scanner assembly 2. At this point it should be understood that second top plate 26 is similarly formed and includes a corresponding magnet receiving section 40 having arranged therein an associated magnet 42 that is spaced from, and in vertical alignment with, the other magnet provided in base plate 4. A second coil 44 is arranged between magnet 42 and the other magnet arranged in base plate 4. Second coil 44 forms part of another actuating mechanism (not separately labeled) for scanner assembly 2.

As best shown in FIG. 2, scanner assembly 2 also includes a scanner chip body 60 that is sandwiched between base plate 4 and top plates 24 and 26. In accordance with the exemplary embodiment shown, scanner chip body 60 includes a main body member 63 having a first substantially planar surface 69 and a second substantially planar surface 72 that define an outer peripheral edge portion 73. First substantially planar surface 69 extends parallel to, and faces, first substantially planar surface 8 of base plate 4, while second substantially planar surface 72 extends parallel to, and is offset from, first substantially planar surface 69. In addition, main body member 63 includes a mechanical ground portion 74, a scan table base portion 75, and a suspension portion 76 that flexibly interconnects scan table base portion 75, first and second coils 38 and 44 and mechanical ground portion 74. That is, suspension portion 76 includes an ensemble of fixtures, frames and beams (not shown) that enable controlled positioning and motion of scan table base portion 75 relative to mechanical ground portion 74. Main body 63 is supported upon base plate 4 at mechanical ground portion 74 through a plurality of support members or stand-offs 78a-78e. Stand-offs 78a-78e not only provide support for main body 63 but also establish a defined spacing and provide a number of glue surfaces. That is, stand-offs 78a-78e fixedly interconnect main body 63 and base plate 4.

In further accordance with the exemplary embodiment shown, scanner assembly 2 includes a scan table layer 80. Scan table layer 80 includes a main body 90, a first scan table platform 98 having first substantially planar surface 100 and a second substantially planar surface 104 that support a media member (not separately labeled). First planar surface 100 faces, and is off-set from second planar surface 72 of main body 63. Second substantially planar surface 104 extends parallel to, and is offset from, first substantially planar surface 100. In the exemplary embodiment shown, first scan table platform 98 is supported upon main body 63. More specifically, first scan table platform 98 is fixedly mounted to scan table base portion 75 through a plurality of stand-offs, two of which are shown at 10a-10b. Stand-offs 10a and 10b provide a desired spacing between first scan table platform 98 and main body 63, thereby permitting a relative motion of vertically off-set, overlapping components. First scan table platform 98 and main body 63 further serve to form a rigid, multi-layer media support table (not separately labeled) that is a composite of first scan table platform 98, the plurality of stand-offs, e.g., 110a-110b, and scan table base portion 75. This rigidity ensures that desired mechanical properties of main body 63, such as an ability to attenuate mechanical shocks, or the ability to transmit actuation, are shared with first scan table platform 98. With this arrangement, first scan table platform 98 extends beyond an outer peripheral edge portion 73 of scan table portion 75 to provide an increased area for supporting media while, at the same time, retaining the functions of vibration isolation/attenuation and actuation. Further, with this arrangement, scanner assembly 2 can be provided with additional components to accommodate various additional capabilities for a probe storage device without realizing an increase in overall package size yet still provide any necessary vibration isolation. Thus, scanner assembly 2, constructed in accordance with exemplary embodiments of the present invention, is ideally suited for mobile storage applications. Of course, in addition to a suitability for mobile storage applications, scanner assembly 2 can be employed in a wide range of media storage applications.

Figure 3:
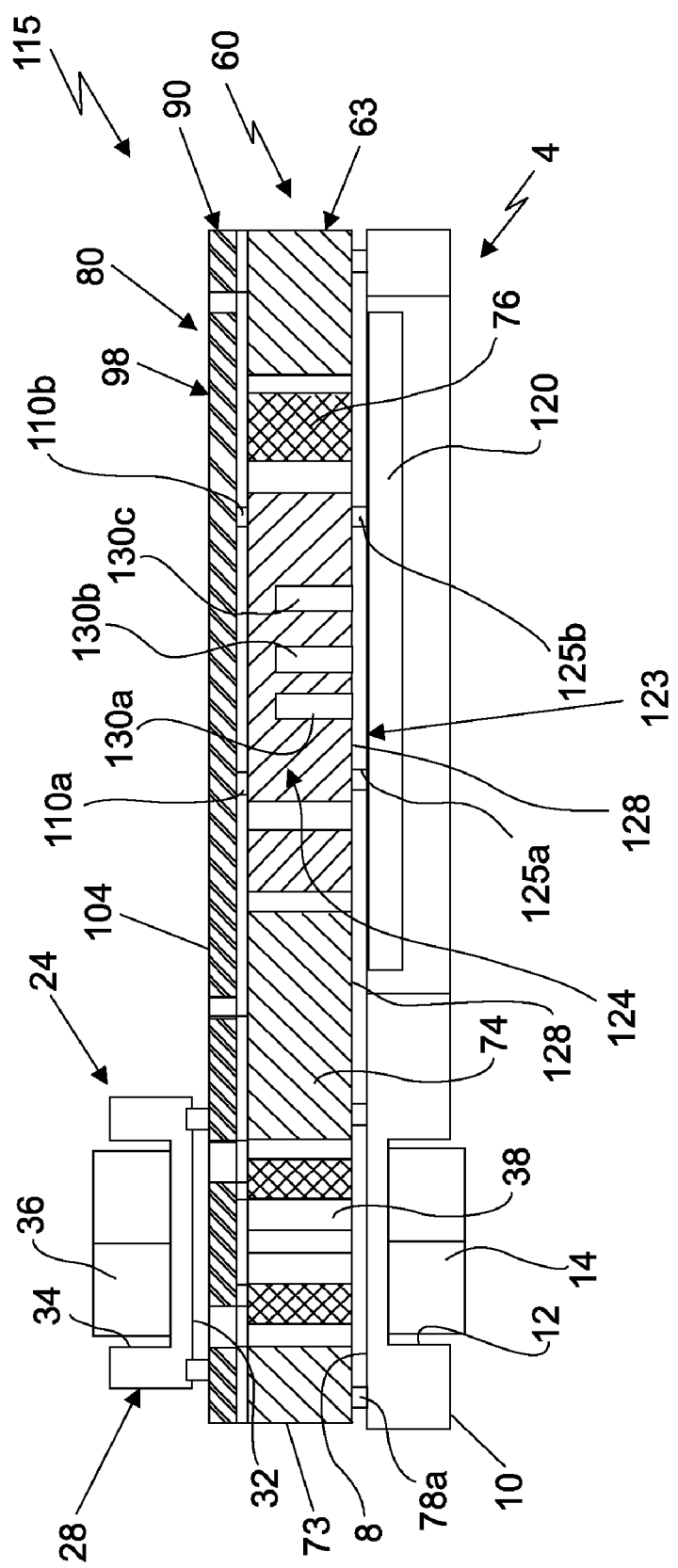
FIG. 3 is a cross-sectional side view of a scanner chip for a probe storage device constructed in accordance with a second exemplary embodiment of the present invention.

It should be appreciated that while a multi-layer media support table is shown and described with a single scan table platform, a probe storage device 115, constructed in accordance with a second exemplary embodiment of the present invention illustrated in FIG. 3, where like reference numbers represent corresponding parts in the respective views, includes a second scan table platform 120 mounted to a scanner chip body 123 having a main body 124, in a manner similar to that described above. Second scan table platform is mounted to main body 124 through a plurality of stand-offs, two of which are shown at 125a-125b. More specifically, second scan table platform is mounted to a side 128 of main body 124 that is opposite to first scan table platform 98. Second scan table platform 120 further enhances a usable surface area of scanner chip body 123 to support media that is resistant to accelerations associated with mechanical shocks. Second scan table platform 120 extends parallel to first scan table platform 98 and is mechanically linked with scanner chip body 60. In the embodiment shown, second scan table platform 120 is actually mounted within a recess (not separately labeled) formed in base plate 4. It should also be appreciated that exemplary embodiments of scanner chip body 60 include a scan table base portion 128 having at least one of a hollow portion, a perforated portion and/or a thinned portion, such as indicated at 130a-130c, in order to increase the resistance to shock of the scanner assembly and/or to facilitate fabrication.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

The invention claimed is:

1. A probe storage device comprising:
   a base plate including a main body having a substantially planar surface;
   a scanner chip body extending across the base plate, the scanner chip body includes first and second parallel substantially planar surfaces that collectively define an outer peripheral edge portion, the scanner chip body further includes at least a mechanical ground portion fixedly mounted to the base plate, a suspension portion, and a scan table base portion, the scan table base portion being selectively movable relative to the mechanical ground portion;
   a scan table platform having first and second parallel substantially planar surfaces, the scan table platform extends across, is offset relative to, and mechanically linked with the scan table base portion, wherein the scan table platform forms a composite, multi-layered support table for the media; and
   another scan table platform mounted to the scanner body, the another scan table platform being arranged parallel to the scan table platform and mechanically linked with the scan table base portion.

2. The probe storage device according to claim 1, wherein the scan table platform extends beyond the outer peripheral edge portion of the scanner chip body.

3. The probe storage device according to claim 2, wherein the scanner chip body includes at least one of a hollow portion, a perforated portion and a thinned portion.

4. The probe storage device according to claim 1, wherein the scanner chip body includes at least one of a hollow portion, a perforated portion and a thinned portion.

* * * * *